July 5, 1938.  H. F. URECH  2,123,126
GARBAGE CAN
Filed July 7, 1937
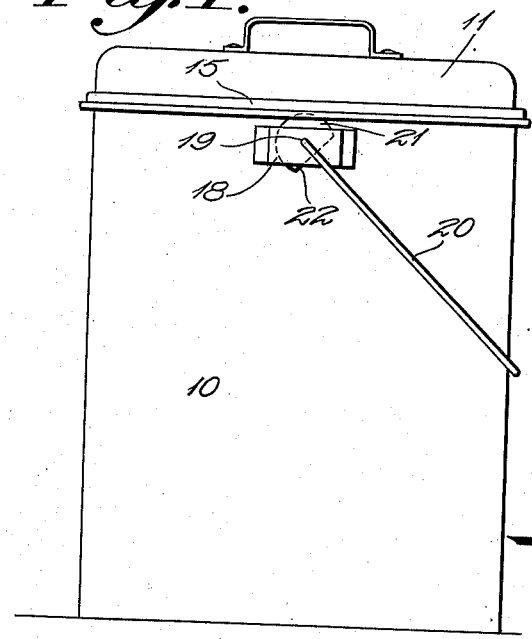
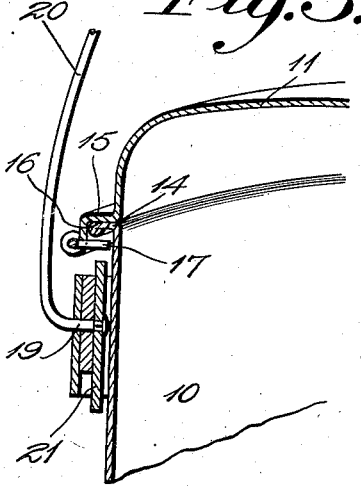
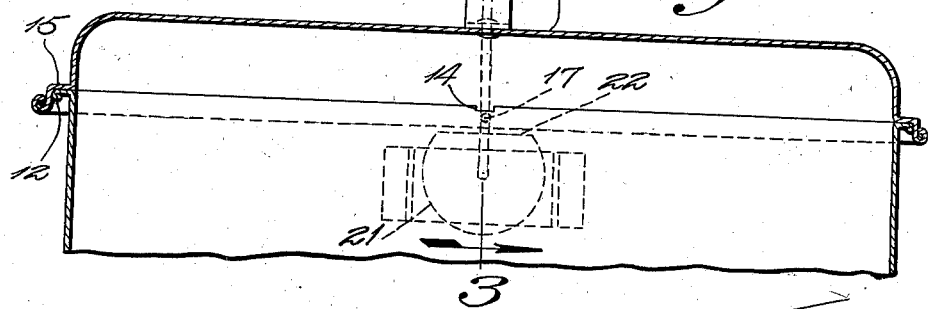
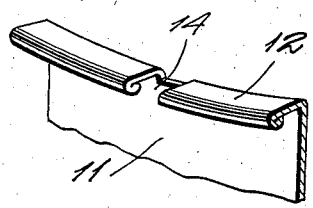
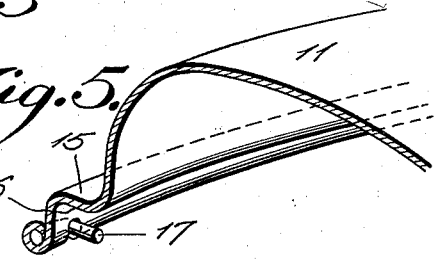
Henry F. Urech
INVENTOR
BY Victor J. Evans & Co.
ATTORNEYS
WITNESS Patented July 5, 1938

2,123,126

UNITED STATES PATENT OFFICE 2,123,126

GARBAGE CAN

Henry F. Urech, Beaumont, Tex.

Application July 7, 1937, Serial No. 152,430

1 Claim. (Cl. 220—56)

The invention relates to a garbage can and more especially to a latch lid garbage container.

The primary object of the invention is the provision of a container of this character, wherein the lid thereof can be latched upon the body of such container and through the bail or handle will be sustained latched so as to avoid any possibility of the accidental removal of the cap from the body, the lid being readily removable when access is to be had to the body.

Another object of the invention is the provision of a container of this character, which is in the form of a garbage can and its lid or cover can be readily and easily applied to or removed from the can and when applied can be locked or latched thereto, the latching of the lid or cover being had in a novel manner.

A further object of the invention is the provision of a container of this character, which is simple in construction, thoroughly reliable and efficient in operation, strong, durable, enabling the latching of the lid or cover in place with dispatch and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of a container constructed in accordance with the invention, its lid or cover being latched.

Figure 2 is a fragmentary vertical sectional view through the container.

Figure 3 is a sectional view on the line 3—3 of Figure 2 looking in the direction of the arrows.

Figure 4 is a fragmentary perspective view of the body of the container with the lid or cover removed.

Figure 5 is a fragmentary perspective view partly in section of the lid or cover removed from the container.

Similar reference characters indicate corresponding parts throughout the several views in the drawing.

Referring to the drawing in detail, the container comprises a cylindrical body 10 preferably made from sheet metal closed at its bottom and open at its top and upon this open top is releasably fitted a lid or cover 11 for the closing of said container.

The body 10 at its open top is formed with an out-turned annular flange 12 with a downwardly and inwardly bent or curled outer edge 13 reinforcing the said flange 12 while provided in this flange at each of diametrically opposite sides thereof is a notch 14 for a purpose presently described.

The lid or cover 11 is formed with an outstruck internally channeled marginal ledge or rim 15 providing an annular seat 16 for accommodating the flange 12 on the body 10 when the lid or cover is placed thereon for closing the same. This ledge or rim 15 has at each of its diametrically opposite sides an inwardly directed keeper lug 17 intersecting the seat 16 and this lug is adapted to be passed through the notch 14 in the flange 12 for latching beneath said flange 12 when the lid or cover 11 is rotated on the body 10.

Externally on the body 10 immediately beneath the notch 14 adjacent thereto is an open bearing 18 accommodating the pivot end 19 of a swinging bail or loop handle 20 for the said body. This pivot end 19 within the bearing 18 has fixed thereto a cam 21 formed with a flat marginal portion 22 which when the bail or handle 20 is in perpendicular position confronts the notch 14 in the flange 12 so as to afford a clearance for the keeper lug 17 to permit it to register with the said notch 14 and thus the lid or cover 11 can be lifted off of the body 10 for the opening of the latter. When the bail or handle 20 is swung arcuately to either side of the perpendicular, the cam 21 will act upon the lug 17 next thereto when the lid or cover 11 has been placed upon the body 10 so that such lug 17 will be shifted to latching position by contacting with the straight portion 22 of the cam during the turning of the latter. This cam when the bail or handle 20 is arcuately swung at its circular periphery closes the notch 14 to eliminate the passing of the lug 17 through the notch 14 accidentally for the freeing of the lid or cover. When the cam 21 closes the notch 14, the lug 17 can not pass through the notch 14 in the flange 12 and thus the lid or cover 11 is latched fastened upon the body 10 for the closing thereof.

What is claimed is:

A container comprising a body open at its top and having an out-turned annular flange at the open top, the flange being notched, a lid or cover closing the open top of said body and having a marginal rim forming a seat for the flange on said body, a keeper lug projecting inwardly from the rim and adapted to pass through the notch in the flange on the body for latching engagement therewith, and a bail pivotally connected with the body and having means active upon the lug to move the same into latching position with the flange on the body and closing the notch in said flange, the said means including a cam having a flattened peripheral portion and turnable next to the notch in the flange for coacting with the lug on the rim of said lid or cover.

HENRY F. URECH.